June 25, 1957  J. F. ZISKAL  2,796,851
VALVE OPERATING MECHANISM FOR HYDRAULIC STEERING SYSTEMS
Filed March 30, 1954  4 Sheets-Sheet 1

INVENTOR.
Joseph F. Ziskal
BY Paul O. Pippel
Atty.

June 25, 1957  J. F. ZISKAL  2,796,851
VALVE OPERATING MECHANISM FOR HYDRAULIC STEERING SYSTEMS
Filed March 30, 1954  4 Sheets-Sheet 3

INVENTOR.
Joseph F. Ziskal
BY
Attly.

June 25, 1957     J. F. ZISKAL     2,796,851

VALVE OPERATING MECHANISM FOR HYDRAULIC STEERING SYSTEMS

Filed March 30, 1954     4 Sheets-Sheet 4

INVENTOR.
Joseph F. Ziskal
BY Paul O. Pippel
Atty.

2,796,851

VALVE OPERATING MECHANISM FOR HYDRAULIC STEERING SYSTEMS

Joseph F. Ziskal, Brookfield, Ill., assignor to International Harvester Company, a corporation of New Jersey Application March 30, 1954, Serial No. 419,645

3 Claims. (Cl. 121—46.5)

This invention has to do with hydraulic steering mechanism for vehicles and more particularly concerns an improved control valve for such mechanism and the manner of mounting the valve upon the vehicle with reference to a principal plane of vibration of the vehicle engine.

A conventional hydraulic steering mechanism for steerable land vehicles employs a two-way hydraulic ram operably connected with dirigible ground-engaging wheels for the vehicle to selectively turn these wheels for steering the vehicle. Fluid for operating the ram is conventionally controlled in its flow to and from the ram by a control valve having a casing with a cylindrical bore within which a plunger is axially movable in either of opposite directions from a neutral position. While the valve plunger is in the neutral position it cooperates with the casing for routing fluid from the outlet of a fluid supply pump back to a reservoir or the inlet side of the pump. When the control valve plunger is moved in one axial direction from neutral the low pressure bypass of fluid through the valve is terminated and the fluid directed under pressure to one end of the ram and conducted from the opposite end of the ram into the valve casing from which it is directed through an exhaust port back to the low pressure side of the fluid supply. When the control valve plunger is moved in the opposite direction the low pressure bypass condition through the valve is again terminated but the fluid under pressure is directed to the opposite end of the ram and returned from the one end thereof through the valve from which it is discharged through the exhaust port back to the low pressure side of the fluid source. An operating connection is provided between the dirigible wheels and the valve for returning the valve plunger from either of its axially displaced positions back to the neutral position attendant to the dirigible wheel means executing steering movement in the direction and amount correlated with the direction and amount of axial displacement of the valve plunger.

The distance of displacement of the valve plunger from the neutral position for terminating the low pressure bypass condition and directing fluid under pressure to the hydraulic ram for effecting steering of the vehicle is small. The applicant has discovered that the tendency of the dirigible wheels of some power steered vehicles, particularly farm tractors, to incur rapid oscillated movement "shimmy" is in part attributable to the orientation of the control valve with reference to the plane of principal vibration of the vehicle engine. Tractor engines when running set up vibrations principally within a plane perpendicular to the crankshaft axis. When a control valve of the above mentioned character is mounted upon the vehicle in such a manner that the axis of the valve plunger is crosswise of the vehicle, the valve is vulnerable to engine vibrations which sometimes shake the plunger axially within the casing to alternately direct fluid to opposite ends of the steering ram at a frequency constituting a period of engine vibration. When this occurs it causes the objectionable "shimmy" of the dirigible wheels. One object of the present invention is to overcome this difficulty by mounting the control valve upon the vehicle in such a manner that the plunger axis is substantially perpendicular to the plane of principal vibration of the vehicle engine.

Another source of fluid pressure oscillations which has caused "shimmy" of the dirigible wheels has been in the control valve itself. In the hydraulic steering control valves of the aforesaid character the casing bore and the plunger have cooperating circumferential lands with fluid-flow-cutoff edges at the ends of these lands. This arrangement of cooperative lands with their annular telescopic control surfaces provides for relatively long circular fluid-flow-cutoff edges which provide for considerable flow capacity between certain of these cutoff edges while they are separated when the valve plunger is displaced from the neutral position. Because of the length of these fluid-flow-cutoff edges considerable flow area is opened up by incurring a short axial displacement of the plunger from the neutral. However, it has been found that because of the sudden or instantaneous provision of large flow area by minute separation of the fluid-flow-cutoff edges hydraulic shock waves have been set up in the pressure fluid columns of the system. These shock waves of pressure have been of the magnitude that when the shock wave vibration period of the system harmonizes with the endwise vibration period of the valve plunger, this plunger is caused to vibrate axially across its neutral position relatively to the valve casing to alternately direct pressure fluid into opposite ends of the ram to produce the undesired "shimmy" of the dirigible wheel means. Another object of this invention is the provision of notch means in certain of the fluid-flow-cutoff edges of the control valve to slightly attenuate the rate at which the pressure in fluid columns is built up when the valve plunger is displaced from neutral. This diminishes the magnitude of the shock waves in the fluid columns and correspondingly diminishes their tendency to produce endwise vibration of the valve plunger.

The above and other desirable objects inherent in and encompassed by the invention are elucidated in the ensuing description, the appended claims and the annexed drawings, wherein:

Fig. 5 is a longitudinal sectional view taken at the plane indicated by the line 5—5 in Fig. 2 through the control valve for the hydraulic steering system, and such valve being illustrated with the plunger in the neutral position;

Figure 12:
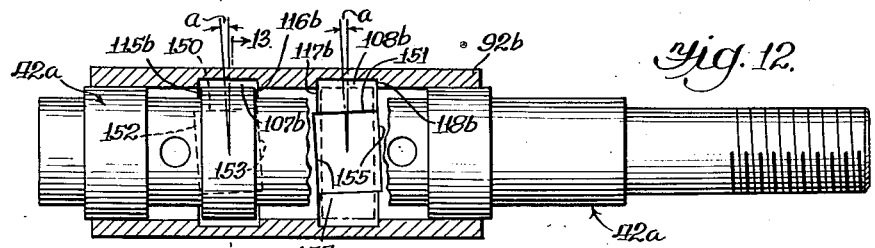
Figure 13:
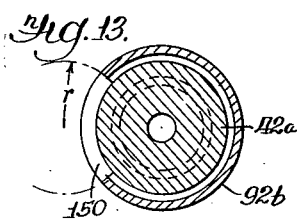

Fig. 12 is a fragmentarily longitudinal sectional view taken through the casing of a modified form of control valve having a plunger shown in side elevation therein and a portion of the plunger broken away to illustrate a different species of fluid pressure attenuating notches in the fluid-flow-cutoff edges of the casing; and Fig. 13 is a transverse sectional view taken on the line 13—13 of Fig. 12.

Figure 1:
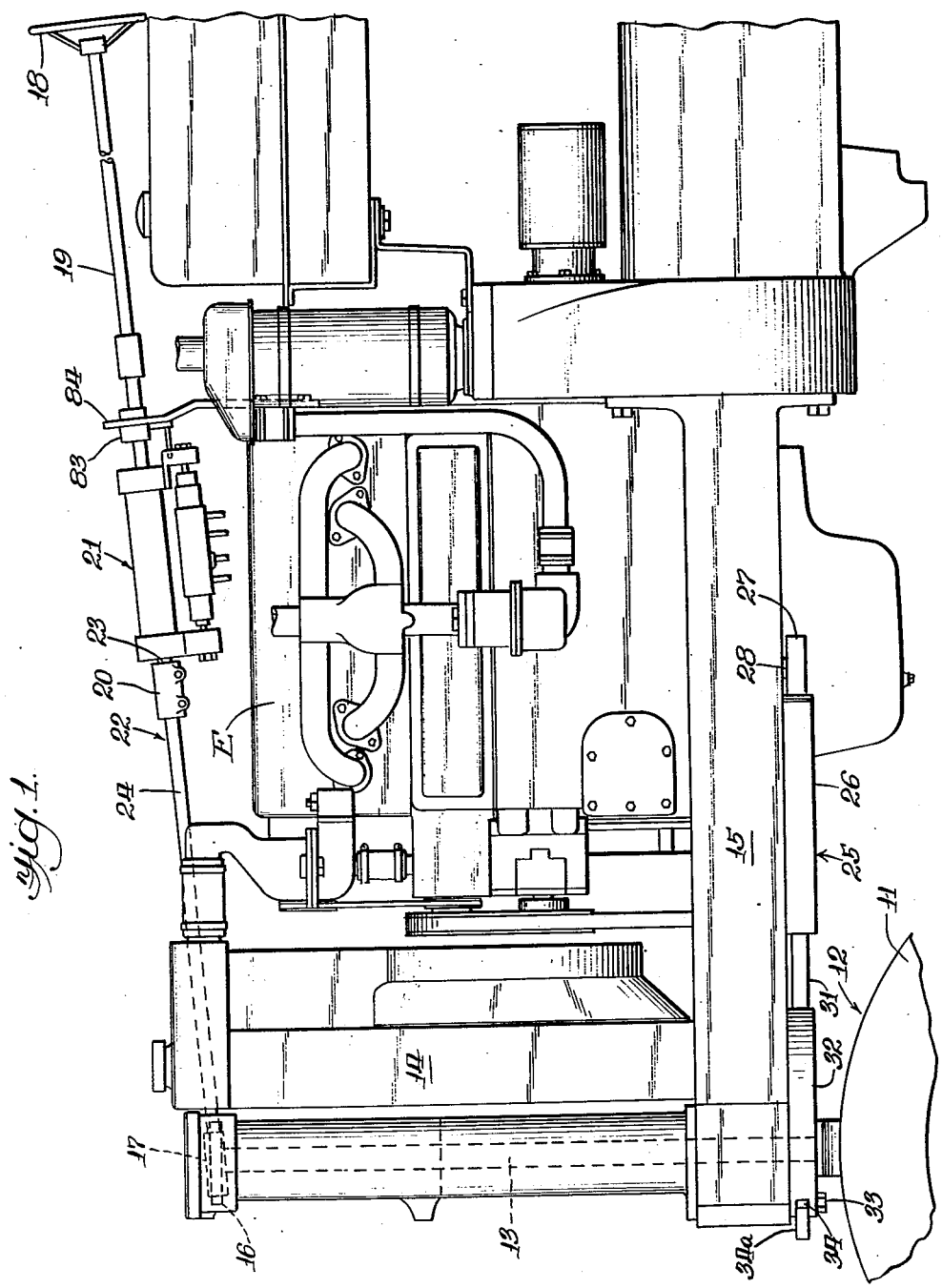
Fig. 1 is a fragmentary side elevational view of a tractor of the tricycle type having a hydraulic power steering system associated therewith including a control valve mounted according to the principles of this invention.

With continued reference to the drawings and particularly to Fig. 1 the front or left end of the tractor, which is of the tricycle type, is supported upon dirigible wheel means 11 constituting part of a steering truck 12 oscillatable about the axis of a vertical shaft 13, Figs. 1, 2, 3 and 4, which projects upwardly in front of the engine radiator 14. The two rear wheels of the tractor which constitute the traction wheels thereof and the rear portion of the tractor body are not shown since they constitute no part of the present invention and are believed unnecessary for illustrating the same.

The tractor engine E is mounted between side sills 15 of the tractor frame, the left hand one of said sills, with respect to an operator facing forwardly upon the tractor, being the only one visible in the drawings, Fig. 1. The upper end of the steering truck operating shaft 13 has a worm gear segment 16 secured thereto. Worm segment 16 is driven by a worm pinion 17 which is manually operated by a steering wheel 18 connected therewith by a steering wheel operated driving shaft 19, a valve operating unit 21 and a driven shaft structure 22 comprising shaft sections 23 and 24 connected together by a coupling member 20. By selectively rotating the steering wheel 18 in opposite directions, the shaft 19, valve operating unit 21, shaft structure 22 and the worm 17 are rotatable for selectively rotating the segment gear 16, the vertical shaft 13 and the steering truck 12 for steering the vehicle conventionally. The vehicle is normally steered, however, except in the event of fluid pressure failure, by hydraulic power steering mechanism including a hydraulic ram 25, Figs. 1 and 2. Said ram 25 includes a cylinder 26 pivotally connected by a bearing 27 at its rear end with a stub bearing mount 28 anchored in the side sill 15. A plunger 29 reciprocal in the cylinder 26 is provided with a piston rod 31 which projects forwardly outwardly through a forward or rod end of the cylinder. The forward end of the piston rod 31 has a C-shaped coupling member 32 upon its forward or left end, as viewed in Figs. 1, 2 and 4. The member 32 is pivotally connected by pin 33 with an apertured ear 34 upon a flange 34a of the steering truck 12. When fluid is introduced into the head end (right end as viewed in Figs. 1 and 2) of the cylinder 25 through a conduit 35 and allowed to exhaust from the rod end of the cylinder through a conduit 36, the ram 25 is operable to rotate the steering truck 12 clockwise as viewed from above; and when fluid is introduced into the rod end of the ram through the conduit 36 and allowed to exhaust from the head end through the conduit 35, the plunger 29 is moved in the opposite direction whereby the ram is operable for moving the steering truck counterclockwise as viewed from above. Fluid circulated by a pump 37, Fig. 2, under control of a valve 38 which in turn is controlled by the steering wheel and the valve operating unit 21, is employed for energizing the ram 25 for imparting selective steering movement to the steering truck 12.

Control valve 38 comprises a casing 39 having a cylindrical interior periphery or bore 41 wherein a valve plunger 42 is selectively axially displaceable in opposite directions from a neutral position illustrated in Fig. 5. When the valve plunger is in the neutral position of Fig. 5, fluid discharged from the pump 37 through a conduit 43 simply circulates at low pressure through the control valve 38 and returns to the pump via an exhaust conduit 44, a reservoir 45 and a return conduit 46. When the valve plunger 42 is moved leftward from neutral the low pressure bypass condition of the control valve is terminated and the fluid from the conduit 43 is diverted through the conduit 35 into the head end of the ram cylinder 26 and the fluid from the rod end of the cylinder is discharged through the conduit 36 and the valve at low pressure and thence through the exhaust conduit 44 to the reservoir and pump. Displacement of the control valve plunger 42 rightward from the neutral position of Fig. 5 conditions the valve for again terminating the low pressure bypass condition and diverting the fluid from the inlet conduit 43 through the conduit 36 into the rod end of the ram cylinder while fluid exhausted from the head end of the cylinder passes at low pressure through the conduit 35, thence through the control valve into the exhaust conduit 44 and thence to the reservoir 45 for delivery to the inlet side of the pump.

Figure 2:
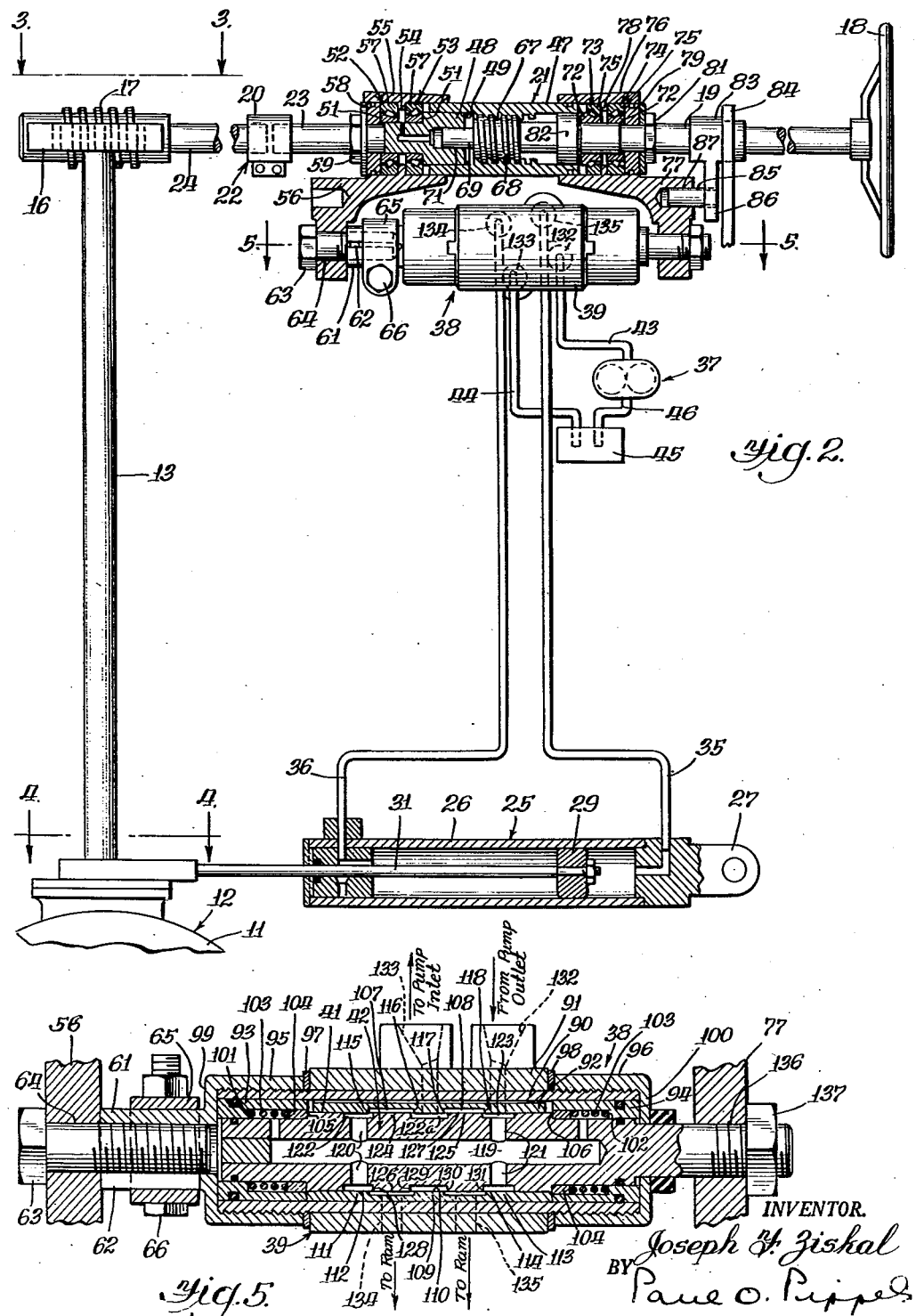
Fig. 2 is a view partly diagrammatic illustrating the hydraulic lines of the power steering mechanism shown in part in Fig. 1 and showing an operating unit for the control valve in cross section.
Figure 3:
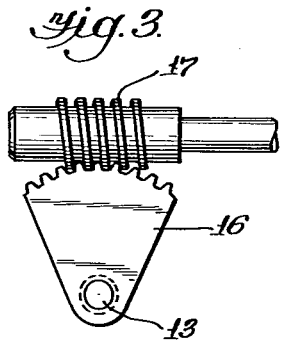
Fig. 3 is a fragmentary horizontal plan view taken on the line 3—3 of Fig. 2 illustrating a worm and segment gear in the connection between a manually operated steering column and the dirigible wheels of the vehicle.
Figure 4:
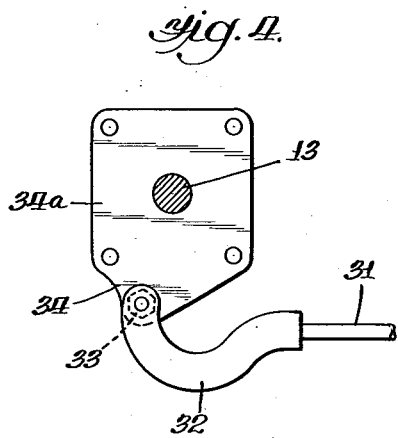
Fig. 4 is a fragmentary horizontal sectional view taken on the line 4—4 of Fig. 2, illustrating the connection of the hydraulic ram with the steering truck including the dirigible wheels of the tractor.
Figure 6:
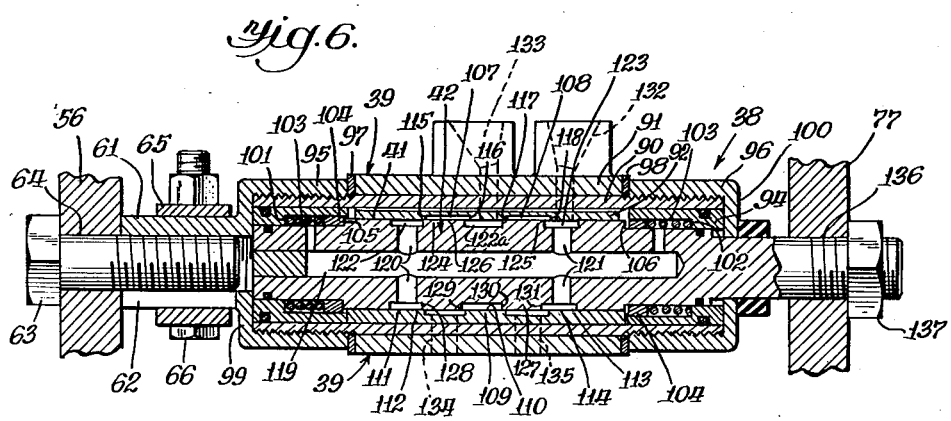
Fig. 6 is a view taken similarly to Fig. 5 but with the valve plunger displaced leftward from the neutral position.
Figure 7:
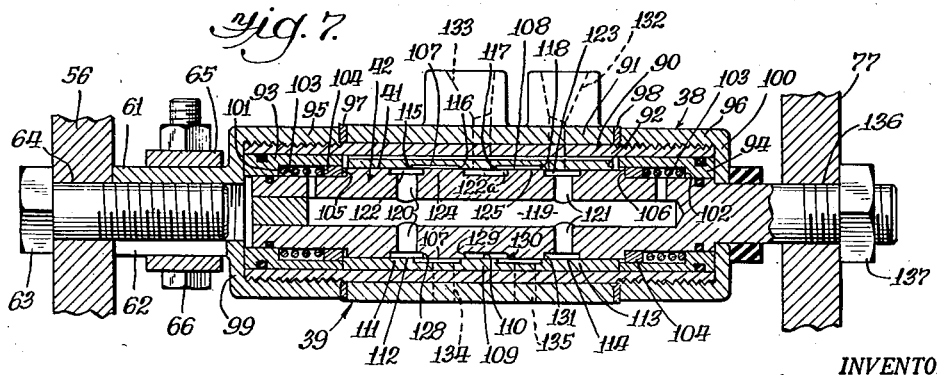
Fig. 7 is also a view taken similarly to Fig. 5 but with the valve plunger displaced rightward from the neutral position.
Figure 8:
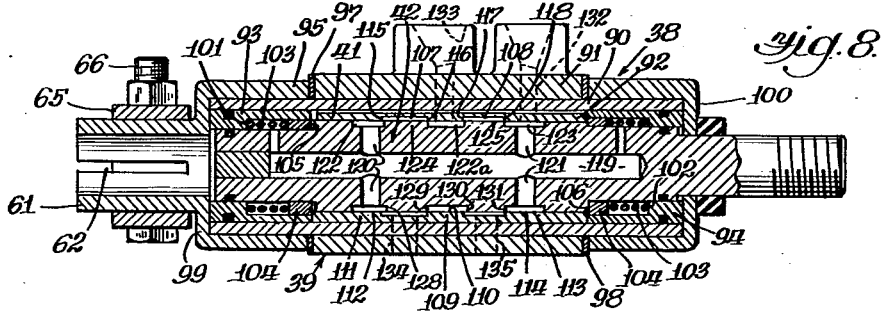
Fig. 8 is also a view taken similarly to Fig. 5 but with the valve plunger displaced rightward from the neutral position just far enough for fluid-flow-cutoff edges of the plunger and casing to register for terminating low pressure bypass of fluid through the valve.

The control valve operating unit 21 comprises a cylindrical casing 47 telescoped at its left end, Fig. 2, onto a cylindrical head 48 on the right end of the shaft structure component 23 and welded to such head at 49. Inner races 51 of tapered roller bearing units 52 and 53 are mounted upon the shaft component 23 whereon they are maintained in axially spaced relation by an internal flange 54 of a hub 55 of a bracket 56 which is mounted upon the outer races 57 of the tapered bearing units 52 and 53. Sealing ring 58 and a nut 59 threaded upon the shaft component 23 maintain the axial assembly of the bearing units 52 and 53 and the spacing flange 54 against the left end of the shaft head 48. Bracket 56 supports the left end of the control valve 38 of which a tubular reduced diameter casing portion 61, Figs. 2 and 5, is internally threaded and provided with an axial slot 62. A cap screw 63 inserted through a hole 64 in the bracket 56 is threaded into the casing extension 61 where this assembly is maintained by a locking band 65 tightened onto the outer periphery of the split extension 61 by a clamping bolt 66. The bracket 56 reacts against the steering column shaft component 23 for constraining the control valve casing 39 against axial movement.

The inner periphery of the casing sleeve 47 is provided with coarse threads 67 which mesh with threads 68 upon an inner end portion of the steering column shaft 19. A reduced diameter inner end portion 69 of the steering column shaft 19 is rotatively piloted within a bearing 71 in the head 48 of the steering column shaft component 23. Inner races 72 of tapered bearing units 73 and 74 are press fitted onto the shaft 19 whereas the outer races 75 of these bearing units are fitted into the inner periphery of a hub 76 of a bracket 77. An inner flange 78 of the bracket hub 76 separates the bearing units 73 and 74 and a sealing ring 79 and a nut 81 threaded onto the shaft 19 maintain the bearing units 73 and 74 together with the hub flange 78 in stacked assembly against an enlargement 82 of the shaft 19. The bearing units 73 and 74 facilitate rotation of the shaft 19 relatively to the bracket hub 76 and the valve operating unit casing 47 while coacting with the shaft enlargement 82 and the nut 81 for constraining the bracket 77 for endwise movement with the shaft 19.

A supporting bearing 83 for the steering column shaft 19 is supported within a bracket 84 which is mounted upon the rear end of the tractor engine E; see Fig. 1. A pilot pin 85 for the bracket 77 is anchored in an arm 86 depending from the bearing 83 and projects slidably into a recess 87 of the bracket 77. The pilot pin 85 accommodates movement of the bracket 77 axially of the steering column but prevents rotation of the bracket 77 about the axis of its hub 76.

The control valve casing 39 comprises a long cylindrical sleeve 90 having an outer sleeve 91 mounted firmly on its outer periphery. An inner sleeve 92 is mounted firmly within the inner periphery of the cylindrical sleeve 90 and short sleeves 93 and 94 are within the sleeve 90 at opposite ends of the sleeve 92 in abutting relation with its ends. End caps 95 and 96 are threaded onto opposite ends of the sleeve 90 against spacer rings 97 and 98 which abut against opposite ends of the sleeve 91 to maintain the latter centered with respect to the sleeve 90. Shoulders 99 and 100 of the caps 95 and 96 abut against the end sleeves 93 and 94 to maintain the latter assembled against the ends of the interior sleeve 92. Shoulders 101 and 102 of the end sleeves 93 and 94 serve as abutments for one end of respective centering springs 103 for the valve plunger 42. These springs 103 react through rings 104, slidable internally of the end sleeves 93 and 94, against shoulders 105 and 106 of the valve plunger. Movement of the rings 104 toward one another axially of the valve casing 39 is limited by their abutment with opposite ends of the valve casing sleeve 92; note the lower portion of Figs. 5, 6, 7 and 8.

The inner periphery of the sleeve 92 contains a pair of axially spaced annular cavities 107 and 108 separated by a central circumferential land 109 having a central annular control surface 110 constituting its inner cylindrical periphery. An end land 111 joins the left end of the annular cavity 107, Fig. 5, and has a cylindrical control surface 112 constituting a portion of the inner periphery of the sleeve 92. At the right end of the annular cavity 108, Fig. 5, there is an end land 113 and having a control surface 114 constituting a portion of the cylindrical inner periphery of the sleeve 92. Annular fluid-flow-cutoff edges 115, 116, 117 and 118 coincide with edges of the control surfaces 112, 110 and 114.

The valve plunger 42 contains an axial bore 119 with radial passages 120 and 121 communicating between such bore and circumferential grooves 122 and 123 respectively bordering the axially outer ends of axially spaced lands 124 and 125 upon the plunger. A circumferential groove 122a girths the plunger between the lands 124 and 125. The lands 124 and 125 have cylindrical control surfaces 126 and 127. Fluid-flow-cutoff edges 128, 129, 130 and 131 are formed upon the ends of the lands 124 and 125. The plunger control surface 126 is alternately telescoped with the casing control surfaces 112 and 110 whereas the plunger control surface 127 is alternately telescopical with the casing control surfaces 110 and 114.

The casing has a fluid inlet port 132 communicative inwardly through the land 113 with the annular plunger groove 123. An exhaust port 133 communicates inwardly through the casing and through the control surface 110 thereof with the annular groove 122a of the plunger. Reversible flow ports 134 and 135 communicate inwardly through the valve casing with the annular grooves 107 and 108, respectively. In Figs. 5 through 8 the reversible flow ports 134 and 135 have been displaced circumferentially of the valve casing with respect to their actual position shown in Fig. 2, to better illustrate how these ports communicate with the annular casing cavities 107 and 108. Inlet port 132 is communicatively connected with the conduit 43 leading from the pump 37 whereas the exhaust port 133 is communicatively connected with the conduit 44 leading to the reservoir 45, and the reversible flow ports 134 and 135 are respectively comunicatively connected with the conduits 36 and 35 leading to opposite ends of the hydraulic ram cylinder 26.

The valve plunger 42 has a reduced diameter outer end portion projecting outwardly through the end cap 96 of the casing into threaded relation with an internally threaded hole 136 in the bracket 77 of the valve operating unit 21. A lock nut 137 maintains the assembly of the valve plunger with the bracket 77 rigid.

Figure 9:
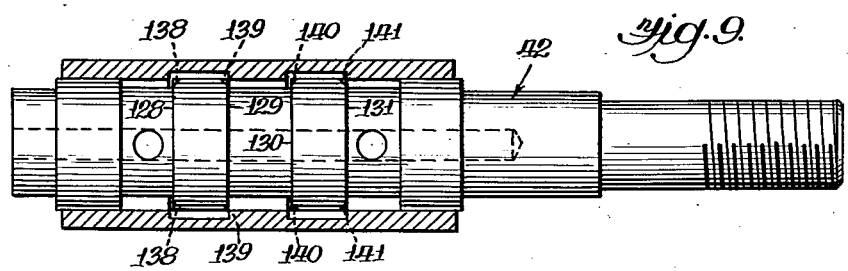
Fig. 9 is an enlarged view showing the valve plunger with respect to a sectionally shown portion of the valve casing, the relative axial position of the casing and plunger being as that shown in Fig. 8 but the plunger being rotated 90° to illustrate sets of notches in the fluid-flow-cutoff edges thereof.
Figure 10:
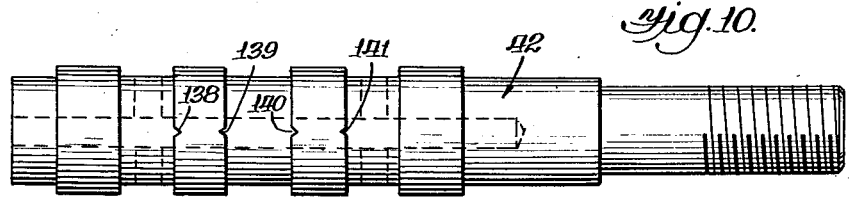
Fig. 10 is a side elevational view of the valve plunger rotated 90° from the position shown in Fig. 9 to produce a further view of the notches in the fluid-flow-cutoff edges.

In Figs. 9 and 10 wherein the valve plunger 42 is shown in side elevation there can be seen small fluid pressure attenuating notches 138, 139, 140 and 141 within the fluid-flow-cutoff edges 128, 129, 130 and 131.

*Operation*

Normally the valve plunger 42 will be in the neutral position illustrated in Fig. 5 where it is yieldably maintained by the helical springs 103. While the valve plunger is in this neutral position hydraulic fluid from the pump 37 which is constantly operated from the vehicle engine by means not shown and unimportant to this invention, flows through the conduit 43, valve port 132, annular groove 123 of the valve plunger, axially of the valve through the annular chamber 108 into the annular groove 122a, outwardly through exhaust port 133, through exhaust conduit 44 back to the reservoir 45 from which it flows through the conduit 46 to the inlet side of the pump 37. Circulation through the just described circuit occurs at low pressure.

When the operator desires to turn the vehicle to his right while it is moving in a forward direction, he will conventionally rotate the steering wheel 18 clockwise, as viewed from the right in Fig. 2. The steering column shaft 19 is similarly rotated together with the threaded end portion 68 thereof which is reacting upon the threaded portion 67 of the sleeve 47, which is then held against rearward (rightward as viewed in Fig. 2) movement by the steering column shafts 23 and 24 reacting through the worm pinion 17 and the worm gear segment 16 and through the steering truck 12 to the ground, pulls the shaft 19, the bracket 77 and the valve plunger 42 forwardly, placing the control valve in the condition illustrated in Fig. 6. Fluid from the pump introduced through the valve inlet port 132 into the annular groove 123 and thence through the radial passages 121 into the axial bore 119 and through the radial grooves 120 into the annular groove 122 can no longer bypass at low pressure into the annular exhaust groove 122a and outwardly through the exhaust port 133 and the conduit 44 to the reservoir 45. Telescoped control surfaces 127 and 110 prevent the flow of fluid from the groove 123 to the exhaust groove 122a whereas telescoped control surfaces 112 and 126 prevent bypass of the fluid from the annular groove 122 into the exhaust groove 122a. Fluid from the groove 123 is thus forced into the annular groove 108 and outwardly through the reversible flow port 135 and the reversible flow conduit 35 into the right end of the ram cylinder 26. This forces the ram plunger 29 and the connecting rod 31 thereof forwardly (leftward as viewed in Figs. 1 and 2) for rotating the steering truck 12 clockwise, as viewed from above. Therefore, the forwardly moving vehicle will be caused to turn to the right. Incident to the steering truck 12 being turned clockwise as viewed from above an amount correlated with the amount of clockwise turning of the steering wheel 18 as viewed from the right in Fig. 2, the turning of the vertical shaft 13 and the worm gear segment 16 with the steering truck 12 will be effective through the worm gear 17 to have rotated the steering column shafts 24 and 23 and the valve operating unit sleeve 47 clockwise, as viewed from the right in Fig. 2, far enough to have reacted through the threaded sections 67 and 68 for displacing the bracket 77 and the valve plunger back to the neutral position.

When the operator desires to steer the vehicle to his left he will rotate the steering wheel 18 counterclockwise as viewed from the right in Fig. 2 which will cause the threaded portion 67 of the steering column shaft 19 to move rightward relatively to the threaded section 67 of the casing sleeve 47. Rightward movement is thus imparted to the bracket 77 and the valve plunger 42 to place this plunger in the position illustrated in Fig. 7 relatively to the valve casing. Since the fluid from the pump that enters the plunger bore 119 through the inlet port 132 and the groove 123 can no longer escape into the annular exhaust port 122a, this fluid is forced outwardly through the radial passages 120 into the groove 122 thence into annular chamber 107 and outwardly through reversible flow port 134 and the conduit 36 into the rod end of the ram 25 for forcing the plunger 29 and the rod 31 rearwardly to rotate the steering truck 12 counterclockwise as viewed from above. Fluid from the right end of the ram cylinder 26 is concurrently displaced through the conduit 35, reversible flow port 135, exhaust annulus 122a and the exhaust port 133 and exhaust conduit 44 back to the reservoir 45. This counterclockwise movement of the steering truck 12, as viewed from above, is accompanied by like counterclockwise movement of the vertical shaft 13 and the worm gear segment 16 to impart counterclockwise rotation to the worm pinion 17, steering column shafts 23 and 24 and the casing sleeve 47 which is thus operable through the threaded sections 67 and 68 to pull the steering column shaft 19 leftward as viewed in Fig. 2. This moves the bracket 77 and the valve plunger 42 leftward from the position shown in Fig. 7 to the position shown in Fig. 5 attendant to the steering truck having been moved a distance corresponding to the initial counterclockwise movement of the steering wheel 18 for producing the power turning of the steering truck.

In the event of failure of the pump 37 so that fluid pressure for operating the hydraulic ram 25 is not available, conventional manual steering of the steering truck 12 is accomplished by rotation of the steering wheel 18 since axial movement of the steering column shaft 19 by the action of the thread 68 upon the thread 67 is limited by abutment of the enlarged threaded section of the shaft 19 with the enlarged end 48 of the steering column shaft 23 or by the bracket 77 with the projecting portion 86 of the bearing 83, following which relative rotation of the threaded sections 67 and 68 can no longer occur and the shaft 19 will thereupon be operable for directly rotating the shafts 23 and 24 for maneuvering the steering truck.

When the valve plunger 42 moves leftward from the neutral bypass condition of Fig. 5, the fluid-flow-cutoff edges 128 and 130 are simultaneously carried into registry with the fluid-flow-cutoff edges 115 and 117 which, excepting for the presence of the fluid pressure attenuating notches 138 and 140, Figs. 9 and 10, in the edges 128 and 130, would cause such a sudden rise in fluid pressure in the valve plunger bore 119 and the pressurized parts of the system communicating therewith as to cause a pressure surge. Frequently this pressure surge sets up on the pressurized portion of the system a series of hydraulic vibrations constituting a harmonic of the natural period of oscillation of the steering truck 12 about the vertical axis of the shaft 13. When this occurs with a sufficiently high amplitude of pressure surges the hydraulically operated steering truck 12 operates through the shaft 13, gear 16 and the worm 17 to impart an overtravel of oscillative movement of the valve actuating casing member 47 to move the valve to and beyond the neutral position each time the neutral setting position is approached and thereby cause operation of the ram in the opposite direction. The operator is unable to control the resulting series of vibrations attendant to which the steering truck 12 oscillates about the axis of the shaft 13 to effect the condition generally referred to as "shimmy." The applicant has found out that this "shimmy" can be avoided by placing the small notches 138, 139, 140 and 141 in the fluid-flow-cutoff edges 128, 129, 130 and 131. The attenuating effect of the notches 138 and 140 in the building up of fluid pressure when the valve plunger is moved leftward and the like attenuating effect of the small notches 139 and 141 when the plunger is moved rightward from neutral prevents the sudden shock wave pressure in the pressurized portion of the system when steering in either direction.

With a system as that herein illustrated, where the control valve plunger control surfaces 126 and 127 have a diameter of one inch, the amplitude of pressure surges in the pressurized section of the system is insufficient to cause the "shimmy" when the delivery rate of the pump 37 does not exceed approximately one gallon per minute. Thus with a pump having a delivery rate of less than substantially one gallon per minute the notches as 138 through 141 are not needed. However, when the delivery rate of the pump exceeds approximately one gallon per minute the notches are necessary to prevent the "shimmy" and are effective for that purpose with the present one inch diameter valve plunger up to a pump delivery rate of approximately two gallons per minute when each of the notches shown constitutes a 90° V-groove .015" deep (radially of the plunger at the cutoff edge with which such groove is associated) and .030" wide circumferentially of the plunger.

Second embodiment

Figure 11:
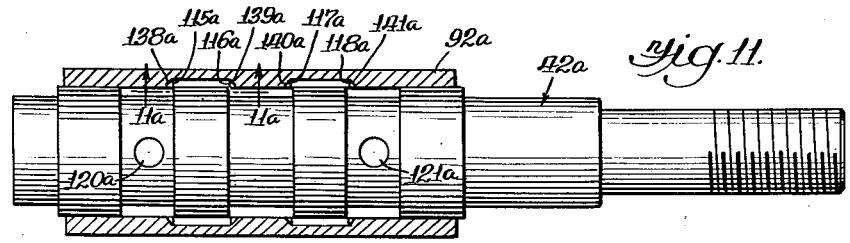
Fig. 11 is a view taken similarly to Fig. 9 but illustrating the pressure attenuating notches in the fluid-flow-cutoff edges of lands on the casing instead of in the edges of lands on the plunger.
Figure 11A:
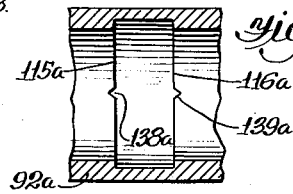
Fig. 11a is a fragmentary view taken on the line 11a—11a of Fig. 11 to illustrate the inner periphery of the valve casing and some of the fluid-flow-cutoff edges thereof having the fluid pressure attenuating notches therein.

In Figs. 11 and 11a there is shown a valve plunger 42a similar in all respects to the plunger 42 excepting for the absence of the pressure attenuating notches 138, 139, 140 and 141. A valve casing sleeve 92a shown only in part in Figs. 11 and 11a is identical with the valve casing sleeve 92 of the first embodiment excepting for the addition of fluid pressure attenuating notches 138a, 139a, 140a and 141a respectively corresponding to the notches 138, 139, 140 and 141 formed respectively in the fluid-flow-cutoff edges 115a, 116a, 117a and 118a which correspond to the edges 115, 116, 117 and 118 of the first embodiment. Placing the notches 138a, 139a, 140a and 141a upon the fluid-flow-cutoff edges 115a, 116a, 117a and 118a amounts to a reversal of parts with respect to the valve structure constituting the first species of this invention, these notches serving the same function as the notches 138, 139, 140 and 141.

Third embodiment

Instead of providing fluid pressure attenuating notches in the form of small V-notches illustrated in Figs. 11 and 11a, a valve sleeve 92b, Figs. 12 and 13, identical with the sleeve 92 of Fig. 5 excepting for the formation of rectangular openings 150 and 151 therein, receives a cooperative valve plunger 42a as that described in connection with Fig. 11. Openings 150 and 151 are respectively associated with annular channels 107b and 108b of the casing sleeve 92b and are similarly formed by the use of a milling wheel not shown but thrust radially inwardly of the sleeve 92b in the manner illustrated in Fig. 13 where the circle with the radius r represents the circular periphery of the cut taken by the wheel into the sleeve. The milling wheel is turned with its axis slightly angularly to that of the sleeve 92b while the cut is being taken so that the straight parallel edges 152 and 153 of the opening 150 are turned angularly with respect to the fluid-flow-cutoff edges 115b and 116b at the opposite ends of the groove 107b with which this opening registers. This angle is designated a in Fig. 12. The edges 154 and 155 of the opening 151 are likewise disposed at an angle a with respect to the fluid-flow-cutoff edges 117b and 118b in which they are formed. The angularly disposed portions 152, 153, 154 and 155 of the fluid-flow-cutoff edges 115b, 116b, 117b and 118b constitute fluid pressure attenuating means cooperating with the valve plunger 42a in the manner described with reference to Fig. 11 for the cooperation of the fluid pressure attenuating notches 138a, 139a, 140a and 141a with the valve plunger 42a.

Having described a limited number of embodiments of the invention with the view of clearly and concisely illustrating the same, I claim:

1. In a control valve for power steering mechanism, a casing having a side wall with a cylindrical interior periphery, an inlet port communicating radially inwardly through the casing wall, an exhaust port spaced axially of the casing from the inlet port and communicating radially outwardly through the casing wall, a central circumferential land upon said inner periphery in registry with the exhaust port, that portion of the inner periphery upon said land constituting a central control surface and axially spaced ends of the land constituting fluid-flow-cutoff edges, annular cavities circumscribing the inner periphery of the casing respectively at opposite ends of said land, and end lands having cylindrical control surfaces constituting part of the inner periphery of the casing respectively adjacent to the annular cavities at the ends thereof opposite from the center land, the end lands also having fluid-flow-cutoff edges respectively at said opposite ends of the annular cavities, the inlet port communicating inwardly of the casing through one of said end lands, reversible flow ports communicating radially through the casing wall in respective registry with the annular cavities, a valve plunger disposed reciprocally within the cylindrical casing periphery, said plunger comprising a circumferential exhaust groove in registry with the exhaust port when the plunger is in a neutral position axially of the casing, said exhaust groove having a length axially of the plunger slightly in excess of the axial length of the central land of the casing, there being circumferential lands upon the plunger at respective ends of said circumferential exhaust groove and having respective cylindrical control surfaces thereon and fluid-flow-cutoff edges circumscribing the plunger at the ends of said control surfaces, said control surfaces of the plunger being in respective registry with the annular cavities of the casing when the plunger is in the neutral position and being of less length than said cavities axially of the plunger whereby the cavities respectively bracket said plunger lands while the plunger is in the neutral position, the plunger also having circumferential grooves bordering respective outer ends of said lands, channel means within the plunger communicating between the last named circumferential grooves and one of said grooves being in communicative registry with said inlet port, the fluid-flow-cutoff edges of the plunger being respectively paired with the fluid-flow-cutoff edges of the casing, and at least one of said edges of each pair containing notch means of limited extent circumferentially of the plunger to provide attenuated communication past each of such pairs when the edges thereof are placed in closing relation attendant to axial movement of the plunger from the neutral position.

2. The combination set forth in claim 1 wherein said notch means constitutes angularly disposed portions of the fluid-flow-cutoff edges on the ends of the casing lands.

3. The combination set forth in claim 1 wherein said casing comprises an internal sleeve having an external periphery and an internal periphery constituting the internal periphery of the casing, and wherein said sleeve contains a pair of side wall openings communicating radially therethrough in respective registry with the annular cavities, each of said openings having opposite parallel sides spaced apart endwise of the sleeve and turned angularly with respect to the fluid-flow-cutoff edges at the opposite ends of the groove with which it registers, and said parallel sides of each opening constituting an angularly disposed notch face within a fluid-flow-cutoff edge at an end of the cavity with which the opening registers.

References Cited in the file of this patent

UNITED STATES PATENTS

| | | |
|---|---|---|
| 1,719,875 | Cooper | July 9, 1929 |
| 2,000,805 | West | May 7, 1935 |
| 2,362,930 | Robbins | Nov. 14, 1944 |
| 2,368,135 | Hamill | Jan. 30, 1945 |
| 2,596,242 | Hill | May 13, 1952 |
| 2,608,263 | Garrison | Aug. 26, 1952 |
| 2,614,539 | Ernst | Oct. 21, 1952 |
| 2,702,529 | Doerfner | Feb. 22, 1955 |